J. A. HOUSTON.
PISTON HOLDING TOOL.
APPLICATION FILED APR. 19, 1913.
1,090,537.
Patented Mar. 17, 1914.
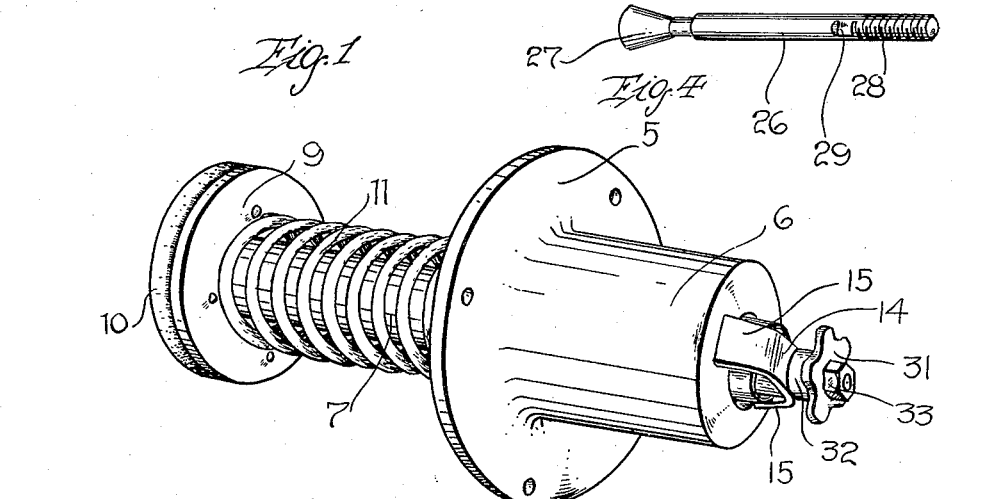
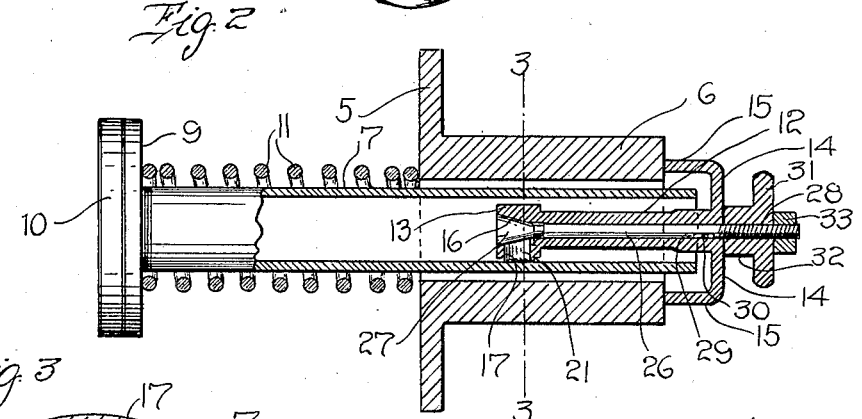
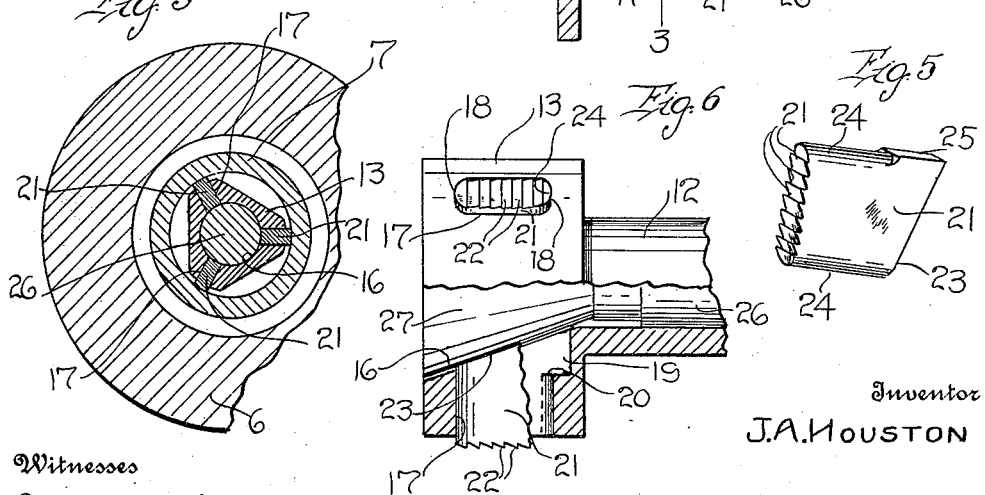
Witnesses
Robert M. Sutphend.
A. J. Hind.
Inventor
J. A. HOUSTON
By Watson E. Coleman
Attorney

UNITED STATES PATENT OFFICE.

JEROME A. HOUSTON, OF SPRINGFIELD, MISSOURI.

PISTON-HOLDING TOOL.

1,090,537.  Specification of Letters Patent.  Patented Mar. 17, 1914.

Application filed April 19, 1913.  Serial No. 762,441.

*To all whom it may concern:*

Be it known that I, JEROME A. HOUSTON, citizen of the United States, residing at Springfield, in the county of Greene and State of Missouri, have invented certain new and useful Improvements in Piston-Holding Tools, of which the following is a specification, reference being had to the accompanying drawings.

This invention relates to an improved piston holding tool and has for its primary object to provide a simple and efficient device for holding the piston in the head of an air brake cylinder while the cylinder is being cleaned or the piston packing renewed.

Another object of the invention resides in the provision of a tool for the above purpose which may be easily and quickly applied to the end of the piston rod or removed therefrom.

A further and more specific object of the invention is to provide a stock or body having a head on one end, a plurality of gripping bits mounted upon said head for engagement with the wall of the hollow piston stem, and a spindle mounted in said stock for longitudinal movement and provided with means for spreading the bits.

A still further object of the invention is to produce a piston holding tool which comprises but few parts of simple form and therefore replaceable at small cost, the invention as a whole being extremely durable and serviceable in practical use.

With the above and other objects in view as will become apparent as the description proceeds, the invention consists in certain constructions, combinations and arrangements of the parts that I shall hereinafter fully describe and claim.

For a full understanding of the invention, reference is to be had to the following description and accompanying drawing, in which—

Figure 1 is a perspective view illustrating the application of my invention; Fig. 2 is a longitudinal section; Fig. 3 is a section taken on the line 3—3 of Fig. 2; Fig. 4 is a detail perspective view of the movable spindle; Fig. 5 is a similar view of one of the gripping bits. Fig. 6 is an enlarged side elevation partly in section of the bit stock.

Referring in detail to the drawings, 5 designates the head of an air brake cylinder, which is provided with a cylindrical boxing 6 in which the piston rod or stem indicated at 7 is mounted for longitudinal movement in the usual manner. This stem is of tubular or hollow form and has secured to one of its ends, the piston 9 to which a packing ring 10 is applied in any approved manner.

11 indicates the spring which is arranged upon the stem 7 and bears at one of its ends against the piston 9, the other end of said spring bearing against the cylinder head 5. This spring acts to yieldingly hold the piston against movement under pressure of the air in the cylinder.

It is to be understood that the invention forming the subject matter of the present application, to be later described, is not limited in its application to the specific construction of the cylinder head or piston arranged therein as the same is illustrated in the accompanying drawings, but is of general utility and may be advantageously employed upon all types of airbrake cylinders now in general use.

My invention embodies in its construction a stock or body 12 which is provided with an enlarged head 13 upon one end, said head being preferably of substantially rectangular form as shown. The other end of the stock 12 has oppositely extending arms 14 integrally formed therewith, the extremities of said arms being angularly disposed and extending in parallel relation to the body of the stock and toward the head 13 thereof as indicated at 15. The stock 12 is longitudinally bored and this bore at one of its ends opens into a concentrically related frusto-conical chamber 16 formed in the head 13. Each of the arms of the head 13 has a slotted opening 17 formed therein communicating with and extending radially from the chamber 16. The opposed end walls of these slots are concave as shown at 18 for a purpose which will later appear and one of said walls at the inner end of each slot is provided with a recess 19 whereby a shoulder 20 is formed.

21 indicates the gripping bits, each of which is provided upon one of its end edges with teeth or serrations 22. The other end edge of the bit is obliquely inclined as shown at 23. The longitudinal edges of the bit 21 are rounded or convex as shown at 24, and one of these edges is formed at one end of the bit with a rectangular enlargement 25. These gripping bits operate in the slots 17 of the stock head and the enlargements 25 thereof are received in the recesses 19 and engage with the shoulders 20 to limit the outward movement of the bits. A spindle 26 is longitudinally movable in the bore of the stock 12 and this spindle at one of its ends is provided with a frusto-conical enlargement 27 with the periphery of which the inner inclined ends 23 of the gripping bits engage. The other end of the spindle 26 is threaded as shown at 28 and adjacent to this threaded portion, the spindle is provided upon one side with a longitudinally extending recess 29. A pin 30 fixed at its ends in the stock 12 extends transversely across this recess whereby the spindle is held against axial movement, the extent of such recess 29 permitting the requisite endwise movement of the spindle 6.

A hand wheel 31 is provided with an interiorly threaded boss 32 for engagement with the threads 28 of the movable spindle. The boss 32 is adapted to bear against the end of the stock body to draw the spindle through the same and force the arms 14 into binding frictional engagement with the end of the boxing 6 on the cylinder head. A suitable lock nut 33 is adapted to be threaded upon the extreme end of the spindle, to hold the hand wheel 31 against turning movement.

By referring to Figs. 1 and 2 of the drawings, the application and use of the invention will be at once understood. When it is desired to clean the interior of the brake cylinder, the head 13 on the end of the stock 12 is inserted into the open end of the piston stem 7. The hand wheel 31 is then threaded inwardly upon the outer end of the spindle so as to draw the enlarged end 27 of the spindle into the chamber 16 in the head of the stock and force the bits 21 outwardly so that their toothed ends 22 will grip the wall of the piston stem. The cylinder head and piston may then be removed and the interior of the cylinder thoroughly cleaned. It will thus be seen that considerable time is saved as it is not necessary to remove the spring 11 from the piston stem and entirely disassemble the parts. The piston is securely held in the head of the cylinder so that a new packing ring may be applied thereto if necessary. The piston is then replaced in the cylinder and the head 5 secured to the body wall thereof, when the tool may be removed from the piston stem. By providing the cutting bits with the convex edges 24 for sliding movement in the concave edges 18 of the slot 17, friction is reduced to a minimum so that a maximum of durability is obtained. When necessary, however, the gripping bits may be replaced at small cost.

From the foregoing, it is believed that the construction and manner of operation of my improved tool will be clearly and fully understood. Owing to the simple construction of the device, it will be obvious that the same can be produced at small manufacturing cost. The tool may be very easily and quickly applied to securely hold the piston in the cylinder head until the gripping bits are released by the adjustment of the movable spindle in the stock. It is of course understood that the device may be made in various sizes for use upon brake cylinder pistons, the stems of which may differ in diameter.

The invention is also susceptible of a great many modifications in the form, proportion and arrangement of the several elements and I therefore reserve the right to resort to all legitimate changes which may fairly fall within the spirit and scope of the appended claim.

Having thus described the invention, what is claimed is:

A tool of the character described comprising a stock having oppositely disposed arms formed upon one end, the extremities of such arms being extended in parallel relation to the stock body, the opposite extremity of such stock being provided with radially disposed openings, the upper walls of which being offset to afford shoulders, a spindle longitudinally movable in the stock, radially movable gripping bits mounted in the radial openings of the stock and having extended portions adjacent their inner ends adapted to contact with the shoulders within the radial openings whereby outward movement of such bits is limited, such spindle and bits being provided with coacting means whereby movement of the spindle in one direction serves to force the bits outwardly, means coacting with the spindle exteriorly of the stock for imparting reciprocal movement to the spindle, and coacting means carried by the stock and the spindle for holding the spindle against axial rotation and limiting the endwise movement of the spindle.

In testimony whereof I hereunto affix my signature in the presence of two witnesses.

JEROME A. HOUSTON.

Witnesses:
A. C. KILHAM,
CHAS. H. YOUNG.

---

Copies of this patent may be obtained for five cents each, by addressing the "Commissioner of Patents, Washington, D. C."